April 30, 1963  W. A. PATTERSON  3,087,845
METHOD OF FORMING SEALS IN PLASTIC ARTICLES
Filed Sept. 18, 1958
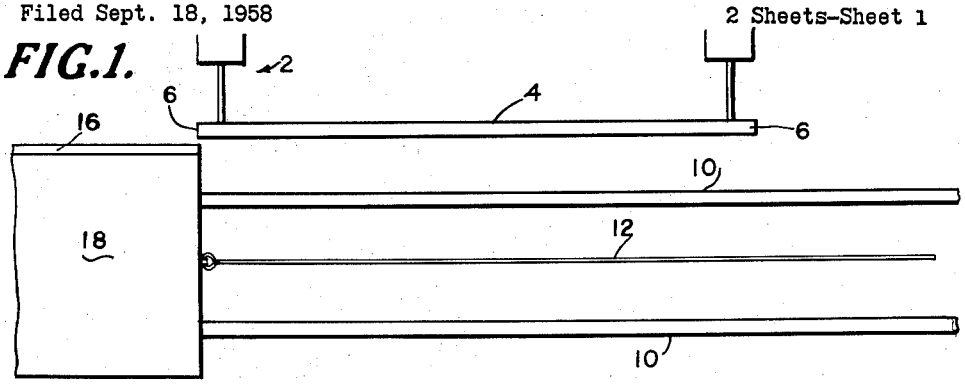
FIG.1.
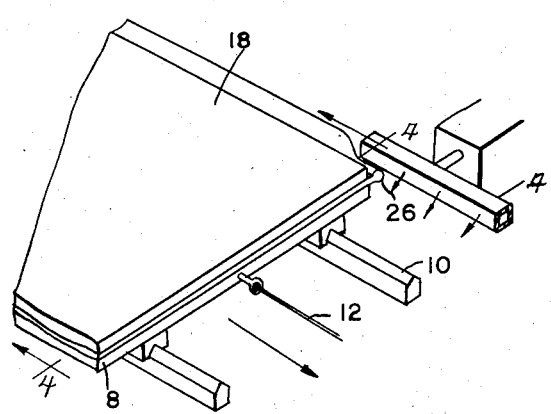
FIG.2.
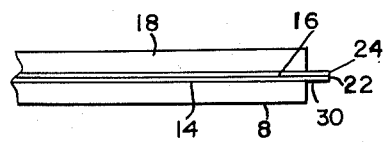
FIG.3.
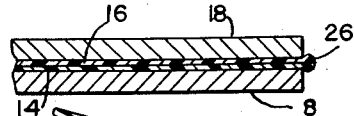
FIG.4.
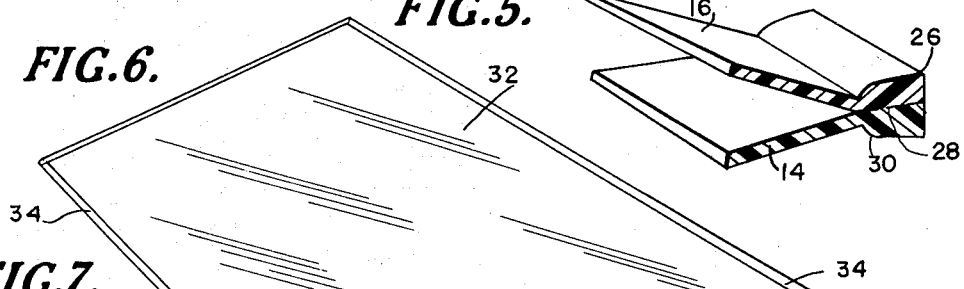
FIG.5.
FIG.6.
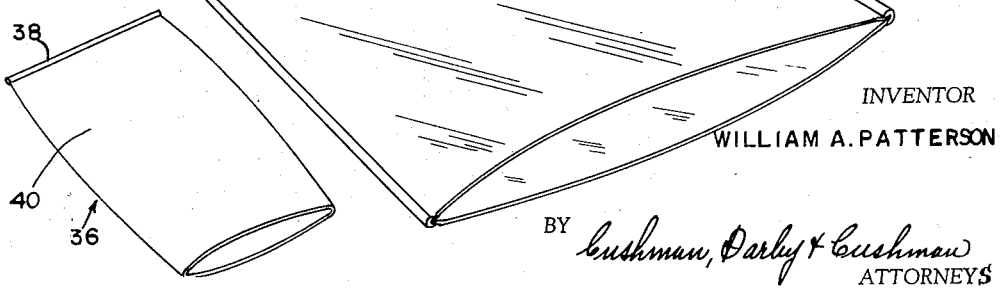
FIG.7.
INVENTOR
WILLIAM A. PATTERSON
BY Cushman, Darby & Cushman
ATTORNEYS April 30, 1963  W. A. PATTERSON  3,087,845
METHOD OF FORMING SEALS IN PLASTIC ARTICLES
Filed Sept. 18, 1958  2 Sheets-Sheet 2

INVENTOR
WILLIAM A. PATTERSON

BY *Cushman, Darby & Cushman*
ATTORNEYS

United States Patent Office 3,087,845
Patented Apr. 30, 1963

3,087,845
METHOD OF FORMING SEALS IN PLASTIC ARTICLES
William A. Patterson, Winchester, Mass., assignor to W. R. Grace & Co., Cambridge, Mass., a corporation of Connecticut
Filed Sept. 18, 1958, Ser. No. 761,741
5 Claims. (Cl. 154—43)

This invention relates to the sealing of high shrink energy films of polyethylene and other plastics.

It is an object of the present invention to form improved seals with heat shrinking polymers having high shrink energy.

Another object is to form improved edge and/or side seams for high shrink energy polyethylene film.

A further object is to devise an improved procedure for sealing high shrink energy polyethylene.

An additional object is to prepare a polyethylene seal having outstanding seal strength.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by heat sealing polyethylene or other plastics having high shrink energy while utilizing either no pressure or only very light pressure in the sealing area to allow shrink to take place. The sides to be sealed are in intimate contact and the edges must be in alignment for proper sealing.

Polyethylene having high shrink energy can be prepared for example by extruding polyethylene in the form of a tube, cooling the extruded tube, irradiating the tube to increase the form stability of the polyethylene, blowing a polyethylene bubble on top of a hot water bath while the bubble is maintained between lower pinch rolls and upper, more rapidly rotating deflate rolls to bilaterally orient the polyethylene and cooling the polyethylene prior to release of the stretching tension. Alternatively, the high shrink energy polyethylene can be formed by irradiating polyethylene, bilaterally stretch-orienting the polyethylene in heated condition with the aid of calendering rolls in known fashion and quenching the polyethylene. Other methods of forming the high shrink energy polyethylene can also be used, and since the methods of forming the high shrink energy polyethylene are known per se, they do not form a part of the present invention.

Shrink energy has been defined as "the energy of contraction at a given temperature when the material is restrained." More specifically, it is defined as "the measurable tension produced in a fully monodirectionally restrained strip of film when heated to the specified temperature."

The high shrink energy polyethylene generally has a shrink energy of 100 to 500 p.s.i. at 205° F.

The invention will be best understood in connection with the drawings wherein:

FIGURE 1 is a plan view of one form of apparatus suitable for carrying out the invention;

FIGURE 2 is a fragmentary perspective view showing the film as it is being introduced into the heat range;

FIGURE 3 is a side elevational view showing superposed layers of polyethylene before heating;

FIGURE 4 is a sectional view taken on the line 4—4 of FIGURE 2;

FIGURE 5 is a fragmentary perspective view of two polyethylene sheets after sealing;

FIGURE 6 is a view of a bag having side seams made according to the invention;

FIGURE 7 is a view of a bag having an end seam made according to the invention;

Figure 8:
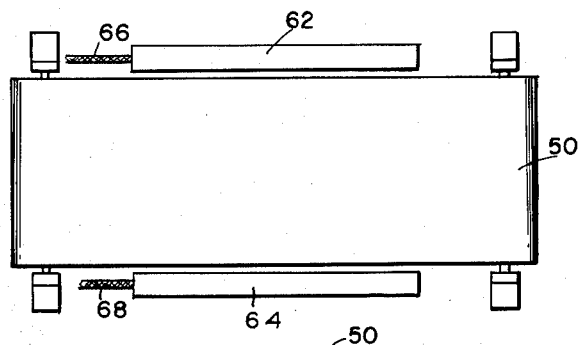
FIGURE 8 is a plan view of another form of apparatus suitable for applying a side seal according to the invention.

Referring more specifically to FIGURES 1 and 2 of the drawings, there is provided an electric heater 2 having a hot bar 4 having a temperature of 250° F. to 1400° F., and a length of ¼ to 13 inches connected via wires 6 to a source of electricity (not shown). A metal plate 8 is pulled with the aid of wire 12 over tracks 10 past hot bar 4 at a rate of 1 to 500 feet/min. by power supplied by a motor (not shown). The temperature, time of treatment and length of the bar are suitably interrelated. On top of the plate 8 is placed sheet 14 of high shrink energy polyethylene usually having a thickness of 0.6 to 2.0 mils (although it can be thicker or thinner), and superposed on sheet 14 is another sheet 16 of high shrink energy polyethylene of similar thickness. On top of sheet 16 is positioned a holding plate 18. Alternatively, the ends of the sheets can be held in tension and plate 18 omitted. Sheets 14 and 16 extend beyond the plates 8 and 18 for about ⅛ to ¼ inch toward the hot bar 4. It is important that sheets 14 and 16 extend the same distance beyond the plates so that their edges 22 and 24 are in alignment and thus are equidistant from the heat source. It is also important that the portions of the sheets 14 and 16 beyond the plates 8 and 18 be in intimate contact and that no significant pressure be applied thereto during sealing. As the aligned edges pass the hot bar 4 the heat shrinks the two sheets 14 and 16 back and away from the hot bar into the form of a thickened bead 26. The bead 26 under the microscope has the form shown in FIG. 5 and is observed to have a faint line of demarcation 28 between the sheets 14 and 16 indicating that complete fusion of adjacent film areas is not obtained but instead there is only partial fusion. The adhesive forces uniting the sheets 14 and 16 at the bead, however, are so strong that it takes a force of 5 p.s.i. up to approximately the film strength, depending on the depth of seal and film thickness, to pull apart the two sheets at the seam. The sheets are restrained by plates 8 and 18 to hold the film and prevent distortion.

It is critical that pressure in the seal area be kept at a minimum since any substantial pressure suppresses the thickness of the shrink area and lengthens the seal since these conditions result in lower seal strength. Any pressure should not be sufficient to substantially distort the rectangular cross section of the sealing bead.

In FIGURE 6 is shown a bag 32 having side seams 34 made in the manner just described.

In place of utilizing two sheets it is also possible to form a bag 36, as shown in FIGURE 7, by forming an end seal 38 on a piece of high shrink energy polyethylene tubing 40.

In a specific example using the apparatus of FIGURES 1 and 2 there was employed a hot bar 13 inches long, and the two sheets 14 and 16 were each made of Alathon 14 polyethylene irradiated at a dosage of 12 megarad and having a shrink energy of 400 p.s.i. at 205° F. Sheets 14 and 16 were each 1.2 mils thick and extended beyond the plates 8 and 18 for ¼ inch. The plates were pulled past the hot bar placed at an angle of ⅛ inch in 13 inches towards the film with a kiss touching at the initial end at a rate of 25 feet/min. The resulting bead seal had a peel seal strength of 18 lbs./linear inch.

Figure 9:
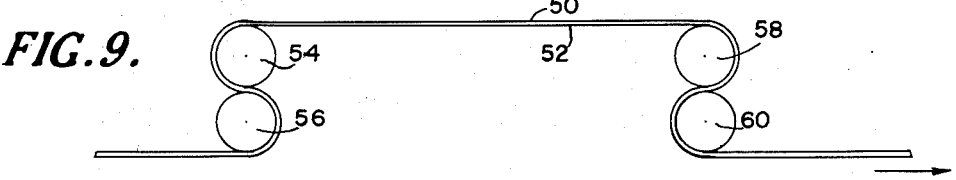
FIGURE 9 is a side elevation of the apparatus of FIGURE 8 with the heating element removed.

Referring to FIGURES 8 and 9, upper high shrink energy polyethylene or polypropylene sheet 50 and lower sheet 52 are maintained under longitudinal tension between rear squeeze rolls 54 and 56 and forward squeeze rolls 58 and 60. This tension keeps the plies in intimate surface contact in the area of the seal. The sides of the sheets 50 and 52 pass between electrical resistance heaters 62 and 64 suitably connected to a source of electricity via wires 66 and 68. In this manner it is possible to simultaneously and continuously form two side seals to form a tube.

Figure 10:
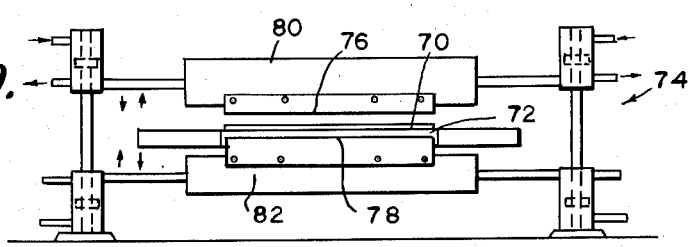
FIGURE 10 is a view of an apparatus suitable for applying an end seal according to the invention.

An end sealing apparatus is shown in FIGURE 10. The ends 70 of the upper and lower sheets are positioned together over the opening 72 in the sealing apparatus 74, the edge extending just beyond the opening, ¹⁄₁₆ to ⅛″ depending on the depth of seal required. Upper heated knife edge 76 comes down on the ends 70 while simultaneously lower heated knife edge 78 comes up on the ends 70. The upper and lower knife edges touch the film sandwich with sufficient pressure to give good heat conduction but not sufficient to hinder shrink appreciably. Pressures of 10 lbs./square inch are more than adequate though lesser pressures are normally desired for the reasons already stated. The ends 70 shrink back as they are sealed together. In FIGURE 10 the vertical arrows indicate the direction of movement of knife edges 76 and 78. The knife edges are made of polytetrafluoroethylene and fiber glass and are fastened to metal bars 80 and 82 which, in turn, are heated by any suitable manner. The heating bars move into and out of contact in a period of ¹⁄₁₀ to ¹⁄₁₀₀ second. To make polyethylene seals, the bars are heated to 350° F.

Figure 11:
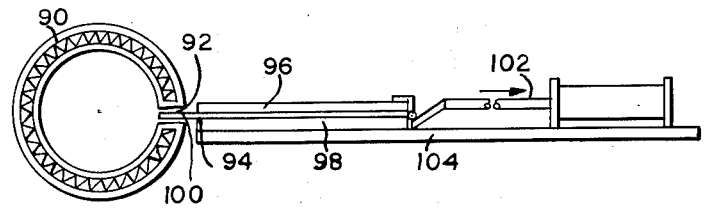
FIGURE 11 is a side view, partially in section, of yet another form of apparatus which can be used for applying an end seal according to the invention.

In FIGURE 11 there is shown a cylindrical heating element 90 having an opening 92 extending the length thereof. Upper and lower polyethylene sheets 94 are placed between top and bottom plates 96 and 98 on support 104 so that the sheets each have an end portion 100 extending ¼ inch beyond the ends of plates 96 and 98. By any appropriate piston system 102 the plates 96 and 98 are advanced so that the end portions 100 extend into the opening 92 in heater 90. The end portions simultaneously shrink back and form a seal. The plates 96 and 98 are then retracted from the heater.

The sealing according to the present invention is accomplished during shrinking. Melt seals which involve making the plastic material molten and applying pressure to fuse the layers of the material together into one mass have an inherent weakness. This weakness is due primarily to the thinning of the film adjacent to the seal area because of the inherent weakness of the fluidized plastic. Furthermore, in high energy shrink films especially the melting destroys crystal orientation and this reduces the inherent strength per unit thickness of film in the seal area. In the shrink seal of the present invention the shrinking characteristic results in a greatly increased thickness of the seal area which materially strengthens the seal. The strength of this seal is due, at least in part, to the rigidity of the film portions in the seal relative to the unsealed film area. Thus, under a peel stress the unsealed portion bends as is usual but the rigidity of the seal portion prevents bending of the seal component. Thus, the actual stress at the seal is essentially a combination of sheer and tensile giving a strong seal under the usual and normal modes of application.

The strength of the total area of the seal components in cross section approximates the strength of the film. As the thickness increases during the shrinking process the strength per unit of thickness goes down but the overall strength remains approximately constant.

It is important that the shrink thickness not be restricted as by pressure since such restriction makes the seal less rigid and there is a tendency for peel stresses to predominate, the strength of the seal area is lessened and the seal strength does not approach that of the film.

The sealing area of the present invention is substantially rectangular in cross section. The strongest seals are obtained when no restraints are applied in a direction normal to the film surface and horizontally across the film, but restraints parallel to the sealing reduce distortion and wrinkling which aid in producing a stronger seal.

While high shrink energy polyethylene is the preferred material, there can be utilized any shrinking polymer, preferably a cross linked shrinking polymer, having at least 30% shrink and a shrink energy over 100 p.s.i.

Among such materials there can be used high shrink energy polypropylene, high shrink energy copolymers of ethylene and propylene (e.g., a 50–50 copolymer) and block copolymers of polyethylene with a minor amount of polyisobutylene (e.g., 95% polyethylene and 5% polyisobutylene, etc.).

Figure 12:
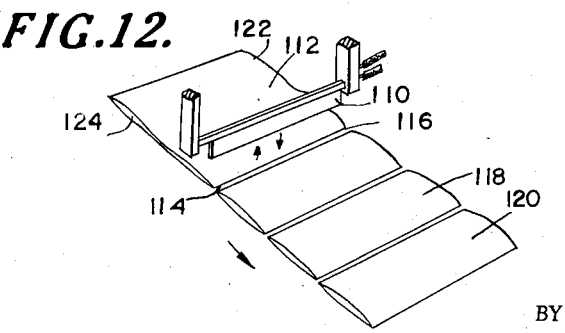
FIGURE 12 is a perspective view of still another form of the invention.

It is also possible to prepare beaded films according to the invention by bringing a hot bar into contact with a double layer of film having high shrink energy, e.g., high shrink energy polyethylene. The material directly beneath the hot bar becomes fluid and the shrink energy of the film in the cooler adjacent areas causes the individual sections of the plies to be pulled apart and away from the hot bar on either side as shown in FIGURE 12. The shrink energy of the film produces a clean break of the plies and produces a seal on either side of the bar, which seal is identical in shape and properties to those obtained in the apparatus of FIGURES 1–9, inclusive. The tremendous shrink energy that is available in the film is thus utilized to pull excess material from underneath the hot bar into the lead which forms the seal.

This form of the invention is illustrated in FIGURE 12 wherein hot bar 110 is shown in position after it has been applied to a double polyethylene sheet 112 having a closed side 122 and an open side 124 and has simultaneously produced side seals at 114 and 116. Previously formed bags are shown at 118 and 120.

In operating the invention as illustrated in FIGURE 12, it is also possible to reduce the time of contact with the hot bar so that the film is not cut along the seal. There likewise can be used a hot wire rather than a hot bar when using such shorter impulse time so that the film is not cut along the seal.

I claim:

1. A process of sealing superposed layers of a cross-linked polymer having substantial shrink and a shrink energy of at least 100 p.s.i. comprising heating the adjacent side of the layers to be sealed in contact with each other at a pressure up to 10 p.s.i., said heating being below that which will cause complete fusion of said layers, and said incomplete fusion being characterized by a faint line of demarcation between said layers, the area of the seal being substantially rectangular in cross section.

2. A process according to claim 1 wherein the cross-linked polymer is cross-linked polyethylene.

3. A process according to claim 2 wherein portions of said superposed layers immediately adjacent the sealing area are restrained from shrinking.

4. Superposed layers of a cross-linked polymer, each of said layers having a portion laminated to the other layer and a portion nonlaminated to the other layer, said layers having a shrink energy of at least 100 p.s.i. in the nonlaminated portion thereof and having substantially no shrink energy in the laminated portion thereof, said laminated portion having a faint line of demarcation indicating the area of lamination, said laminated portion being substantially rectangular in cross section.

5. An article according to claim 4 wherein the cross-linked polymer is cross-linked polyethylene.

References Cited in the file of this patent

UNITED STATES PATENTS

| | | |
|---|---|---|
| 2,488,212 | Lloyd | Nov. 15, 1949 |
| 2,606,850 | Piazze | Aug. 12, 1952 |
| 2,679,469 | Bedford | May 25, 1954 |
| 2,682,910 | Piazze | July 6, 1954 |
| 2,691,474 | Olson | Oct. 12, 1954 |